F. W. MEYER.
SYSTEM OF DISTRIBUTION.
APPLICATION FILED JAN. 11, 1913.

1,186,819.  Patented June 13, 1916.

WITNESSES:
Fred H. Miller
Otto S. Schairer

INVENTOR
Friedrich W. Meyer
BY
Ashley G. Carr
ATTORNEY

UNITED STATES PATENT OFFICE.

FRIEDRICH W. MEYER, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION.

1,186,819.  Specification of Letters Patent.  Patented June 13, 1916.

Application filed January 11, 1913. Serial No. 741,459.

*To all whom it may concern:*

Be it known that I, FRIEDRICH W. MEYER, a subject of the Emperor of Germany, and a resident of Wilkinsburg, in the county of Allegheny and State of Pennsylvania, have invented a new and useful Improvement in Systems of Distribution, of which the following is a specification.

My invention relates to systems of electrical distribution and particularly to those in which induction motors are employed for driving the loads and are regulated and assisted in their operation by auxiliary machines.

The object of my invention is to provide a system of the character indicated in which the secondary winding of the induction motor is connected to the supply circuit through an auxiliary machine that may serve the several functions of a frequency changer, of a motor for assisting the induction motor in carrying the load, and of means for regulating the speed of the motor and compensating the power factor of the system. The auxiliary machine has all of these functions by reason of its peculiar construction, and because it is mechanically coupled to the induction motor.

Figure 1:
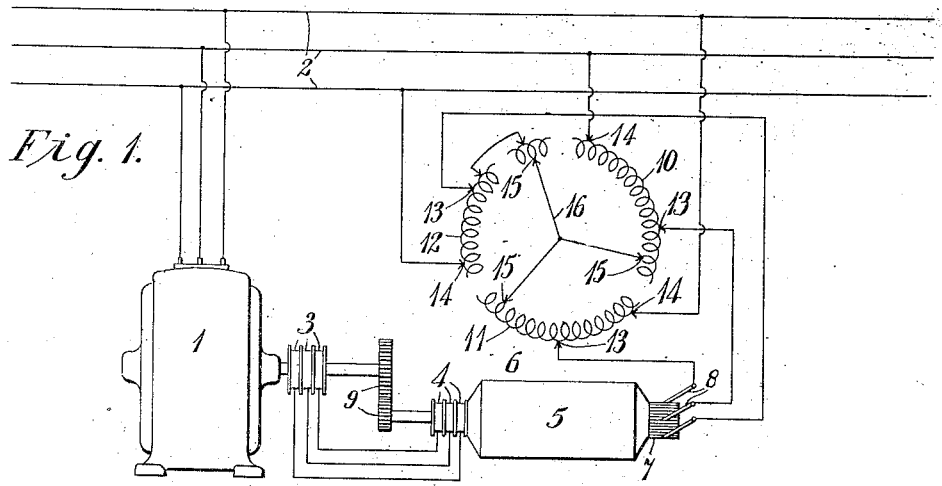
Figure 2:
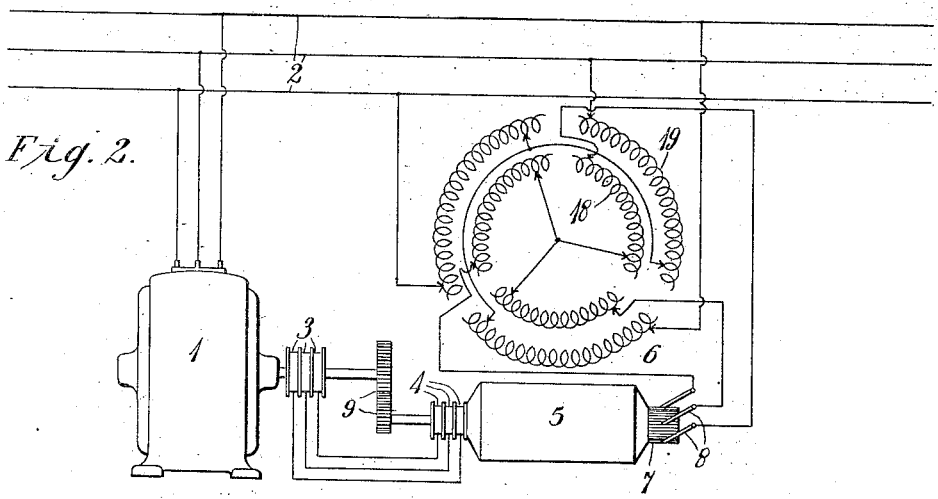

My invention is illustrated in the accompanying drawing, Figure 1 of which is a diagrammatic view of a system of distribution embodying the same, and Fig. 2 is a similar view of a modification of the system of Fig. 1.

The present system comprises an induction motor 1 that is adapted to drive any suitable load (not shown), such as a compressor, hoist or rolling mill, has its primary winding connected to, and receives energy from, a suitable supply circuit 2. The secondary winding of the induction motor is connected through slip rings 3 to slip rings 4 constituting a part of the armature 5 of an auxiliary machine 6, the said armature being also provided with a commutator cylinder 7 upon which bear brushes 8 that are preferably maintained stationary. The armature 5 is mechanically coupled to the secondary member of the induction motor, preferably by means of suitable reduction gearing 9, though it may be coupled thereto in any other suitable manner.

The auxiliary machine 6 is similar to that set forth in another application, Serial No. 653,380, filed by me on October 7, 1911, and is provided with a field or stator winding having a plurality of phase divisions 10, 11 and 12 to which the commutator brushes 8 are adjustably connected at 13, the points of connection being adjustable for the purpose of regulating the voltage applied to, and the speed of, the armature 5. The several phase divisions of the stator winding are also connected at 14 to the supply circuit and to each other at 15 by means of an adjustable connector 16, all of the said points of connection to the stator winding being adjustable for the purpose of adjusting the numbers of active convolutions in the several divisions of the stator winding, and for adjusting the positions of the active portions thereof with respect to the stator and the commutator brushes.

In the operation of the system, the auxiliary machine is driven in relative synchronism with the induction motor on account of the mechanical connection between them, and the speeds of the two machines are regulated by so adjusting the points of connection to the stator winding of the auxiliary machine as to apply the proper voltage to the armature of the auxiliary machine and the secondary member of the induction motor. The voltage may be varied by changing the ratio of the convolutions of the stator winding between the points of connection 13 and 15 thereto respectively of the commutator brushes 8 and the connector 16, to the convolutions between the connections at 14 and 15 thereto respectively of the supply circuit and the connector 16. The stator winding serves not only as a field winding, but also as a transformer for establishing the proper ratio of the voltages between the armature 5 and the supply circuit.

The power factor of the induction motor and also of the system, as a whole, may be compensated by properly shifting the positions of the active portions of the several phase divisions of the stator winding, which may be accomplished by adjustment of the points of connection 14 and 15 respectively of the supply circuit and of the connector 13 to the said winding. By this means, the current taken by the induction motor may be brought into phase coincidence with the voltage of the supply circuit, or may be caused to assume any other relation with respect thereto, so as to obtain the desired phase compensation for the whole set or system. If a large range of regulation is desired, each phase portion of the stator winding may be divided into two or more parts, and an adjustable connection employed between the said parts, such, for instance, as is shown at 12ᵃ in Fig. 1 in connection with the phase division 12. In this way, objectionable disturbance of the revolving field form, and a corresponding influence upon the commutation, may be avoided.

By reason of the mechanical coupling of the auxiliary machine to the induction motor, the auxiliary machine is enabled to assist the induction motor in carrying its load, and the proportion of the load carried by the auxiliary machine may be regulated by changing the total number of active convolutions in the stator winding of the auxiliary machine without changing the ratio of voltage transformation effected by the stator winding. In other words, this regulation may be accomplished by so changing the points of connection to the stator winding as to increase the number of convolutions between the points of connection 14 and 15 thereto respectively of the supply circuit and of the connector 16 without changing the ratio of the convolution between the said points to the convolutions between the points of connection 15 and 13 respectively of the connector 16 and the commutator brushes thereto. The carrying of a part of the load by the auxiliary machine and the ability to regulate the proportion of the load carried by it, is a highly important feature of the present invention since, by proper regulation, the auxiliary machine may be caused to convert all of the electrical energy of the secondary circuit of the induction motor into mechanical energy that is applied to the driving of the load, so that no energy is returned to the line and the efficiency of the system is materially improved. For operation above synchronism, it is best to employ the auxiliary machine only as a frequency changer.

If desired, the stator of the auxiliary machine may be provided, as shown in Fig. 2, with two stator windings 18 and 19 that are inductively related so that the stator may serve as a two winding transformer rather than as an autotransformer, as in Fig. 1. This arrangement has the advantage that the vectors respectively representing the voltages applied to the field and armature may be independently regulated.

It will be noted that the present system involves the employment of but a very small number of parts, and is extremely simple, the simplicity of the system being due to the mechanical coupling together of the machines and to the fact that the stator winding of the auxiliary machine serves the function of a transformer in addition to that of a field winding, thereby obviating the necessity of employing a separate transformer or voltage regulating device. Notwithstanding the simplicity of the system, it embodies means for separately regulating the speed of the induction motor, the power factor of the motor and of the system, and the proportion of the load carried by the auxiliary machine.

The stator winding of the auxiliary machine may, of course, be connected, arranged and proportioned so that the auxiliary machine will have the proper characteristics for any desired service conditions, and the stator may be provided in the usual manner with any compensating or commutating windings that may be necessary or desirable to obtain proper field form and good commutation, all within the spirit of the invention.

I claim as my invention:

1. In a system of distribution, the combination with a supply circuit, and an induction motor supplied thereform, of an auxiliary machine mechanically coupled to the induction motor and electrically connected thereto and to the supply circuit, the said auxiliary machine comprising a distributed field winding having a plurality of phase divisions, an armature having a commutator cylinder and slip rings, brushes engaging said commutator cylinder corresponding in number to the phase divisions of the field winding and respectively connected thereto, and means for varying the lengths of the active portions of the several phase divisions of the field winding.

2. In a system of distribution, the combination with a supply circuit, and an induction motor supplied thereform, of an auxiliary machine mechanically coupled to the induction motor and electrically connected thereto and to the supply circuit, the said auxiliary machine comprising a distributed field winding having a plurality of phase divisions, an armature having a commutator cylinder and slip rings, brushes engaging said commutator cylinder corresponding in number to the phase divisions of the field winding and respectively connected thereto, and means for varying the lengths and relative positions of the active portions of the several phase divisions of the field winding.

3. In a system of distribution, the combination with a supply circuit, and an induction motor supplied thereform, of an auxiliary machine mechanically coupled to the induction motor and electrically connected thereto and to the supply circuit, the said auxiliary machine comprising a distributed field winding having a plurality of phase divisions, an armature having a commutator cylinder and slip rings, brushes engaging said commutator cylinder corresponding in number to the phase divisions of the field winding and respectively connected thereto, and means for varying the relative positions of the active portions of the several phase divisions of the field winding.

In testimony whereof, I have hereunto subscribed my name this 31st day of December 1912.

FRIEDRICH W. MEYER.

Witnesses:
OTTO S. SCHAIRER,
B. B. HINES.